M. BLAU.
EDUCATIONAL DEVICE.
APPLICATION FILED JUNE 11, 1918.
1,279,504.
Patented Sept. 24, 1918.
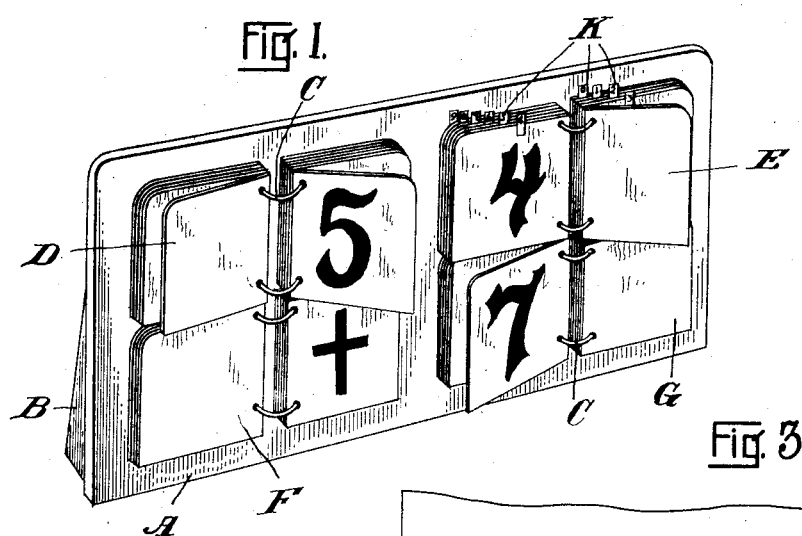
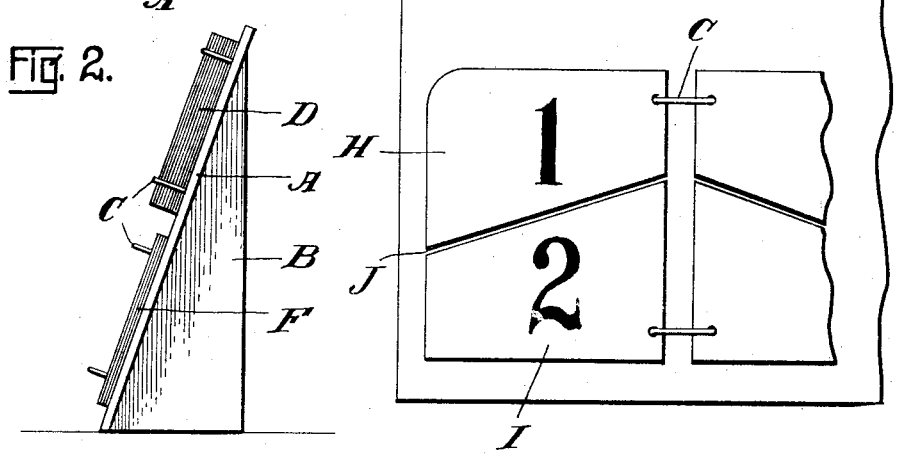
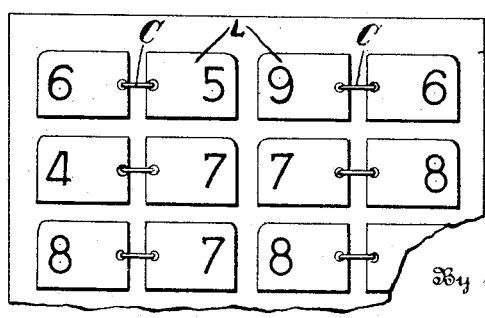

UNITED STATES PATENT OFFICE.

MINNIE BLAU, OF NEW YORK, N. Y.

EDUCATIONAL DEVICE.

1,279,504.  Specification of Letters Patent.  Patented Sept. 24, 1918.

Application filed June 11, 1918. Serial No. 239,378.

*To all whom it may concern:*

Be it known that I, MINNIE BLAU, a citizen of the United States, and resident of New York city, in the county of New York and State of New York, have invented certain new and useful Educational Devices, of which the following is a specification.

This invention relates to educational appliances and is directed particularly to a new and useful device for facilitating the teaching of arithmetic in schools and obviating the loss of time in writing the arithmetical examples on the board. My object is not only to provide a time saving device but in addition to provide an apparatus for the purpose herein set forth which shall furthermore be helpful in training the young mind and effective in impressing on it the rules of arithmetic. My object is further to so construct the apparatus embodying my invention as to make it light and portable so that it may be readily carried from place to place, simple in construction so that is may be easily manipulated and inexpensive to manufacture. My invention has particular application and may be used with great advantage in country schools where there are ungraded classes, a great saving of time being thereby effected and the efficiency of the school being thereby greatly increased inasmuch as in an ungraded class my novel apparatus may be employed in teaching arithmetic to some of the pupils while the others are engaged in another subject, as in an ungraded class my novel apparatus may be employed in teaching arithmetic to changing groups of different grades without the preparation of new material on the part of the teacher.

Further objects and advantages of my invention will appear from the detailed description and the features of novelty will be particularly pointed out in the claims.

In the drawing accompanying this specification and forming a material part thereof—

Figure 1 is a perspective view of an apparatus embodying my invention.

Fig. 2 is an end elevation thereof and

Fig. 3 is a partial elevation showing a modification.

Fig. 4 is a vertical elevation of a modified chart that may be mounted on a frame similar to that shown in Fig. 1 and adapted especially to be used in connection with the teaching of addition.

Referring in detail to the drawing the embodiment of my invention there shown is seen to consist of a frame A that may be supported in any suitable manner as by means of the supports B at the rear of the frame. If desired the frame may be supported on an easel or hang from a wall or any other method may be resorted to for placing the frame in front of the class where it may be easily seen by the pupils.

Held on the frame in any suitable manner are sets of charts D, E, F and G.

These charts may be arranged in book form as shown and detachably or removably held together by means such as the metallic rings C. Of course any other means may be employed to secure the charts or cards together so that they may be held on the frame and yet be readily turned in the same manner as the leaves of a book. To illustrate the use and application of my invention in practice I will now describe a particular arrangement and disposition of charts or cards which has been found very useful in practice in the school room. Thus the series D may comprise 11 charts, one blank and the others bearing numbers from 1 to 10 inclusive and arranged consecutively. Series E may comprise also 11 cards, the first blank and the remaining cards bearing numbers zero to 9 inclusive arranged consecutively. Series F may comprise 5 cards the first one blank and the others bearing the signs indicating the fundamental, arithmetical operations and series G may comprise 11 cards, the first one blank and the remaining cards bearing numbers from zero to 9 inclusive, the same as series E. It will be clear that with charts F and G showing blank, charts D and E may be used to form numbers from 1 to 109 inclusive for the purpose of exhibiting the numbers to the pupils and in this way my invention may be used for the lower grades merely for the purpose of teaching the reading of numbers. For more advanced grades the four charts D, E, F and G may be used together, with D and E showing numbers from 1 to 109 which may be added to, subtracted from or divided by, or multiplied by any number shown on G according to the sign exhibited on F. By the various formations made possible with the particular arrangement described a large variety of examples may be given the pupils as required by the curriculum of study without resorting to writing them out on the blackboard. It will be noted that the use of this apparatus not only obviates the necessity of writing the examples out on the blackboard, but is extremely efficient from a pedagogical standpoint in that it permits of exhibiting to the pupils only one example at a time on which he can easily concentrate in the absence, for example, of such distractions as are occasioned by some charts now in use on which appear a series of examples of which the teacher must point to the particular one to be solved. This advantage is of special importance in connection with the teaching of younger pupils for whom the device is particularly intended.

In Fig. 3 I have shown a modification whereby my apparatus may be adapted also to teaching fractions, thus a series of cards or charts H may be used in conjunction with the corresponding series I, two series being formed by cutting in two a card such as shown in Fig. 1. At the lower edge of the upper card a heavy line J may be drawn for the dividing line for the fraction. With a given card in series H exhibited various fractions may be formed by turning the cards in series J as will be readily understood.

In Fig. 4 I have shown a modified form of chart which may be mounted on a frame or in any other suitable manner and which is especially adapted for teaching addition. In this chart I provide a plurality of series of cards L arranged in vertical columns in book form. Numerals on these cards may be arranged in any order from zero to 9 and as will be readily clear this chart may be used to great advantage in teaching addition of any number of columns of figures. In the form shown the maximum number of columns that may be added is four, but of course, this can be extended by the addition of more vertical columns of cards.

I do not, of course, limit myself to the particular construction shown in the drawing or the particular arrangement described in the illustration as many variations may be resorted to within the scope of the present invention. Thus the frame may be provided with means for hanging the device on the wall or the symbols and figures on the charts may be varied as desired, and an index such as shown at K in Fig. 1 may be provided for the groups and charts.

It will thus be clear that I have provided a new and useful educational device especially adapted for teaching arithmetic to younger pupils which is effective and efficient, portable and compact and yet simple in construction, readily manipulated and inexpensive to make.

Having thus described my invention what I claim as new and desire to secure by Letters Patents is:

1. In an educational device the frame, groups of charts held on said frame adapted to be exhibited thereon, each of the charts in a group bearing one of the cardinal numbers.

2. In an educational device the frame, groups of charts held on said frame adapted to be exhibited thereon, one of said groups having charts bearing the signs of the fundamental arithmetical operations and each of the charts in the remaining groups bearing one of the cardinal numbers.

3. An educational device comprising a frame, a plurality of groups of charts arranged in book form held on said frame and adapted to be exhibited thereon, charts in one of said groups bearing numbers one to ten in consecutive order, the charts in another of said groups bearing numbers zero to 9 in consecutive order, the charts in a 3rd of said groups also bearing numbers from zero to 9 arranged in consecutive order and the charts in one of said groups bearing each one of the symbols of the fundamental, arithmetical operations.

4. An educational device comprising a frame, a plurality of groups of charts arranged in book form held on said frame and adapted to be exhibited thereon, charts in one of said groups bearing numbers one to ten in consecutive order, the charts in another of said groups bearing numbers zero to 9 in consecutive order, the charts in a 3rd of said groups also bearing numbers from zero to 9 arranged in consecutive order and the charts in one of said groups bearing each one of the symbols of the fundamental, arithmetical operations, and the charts in another of said groups being divided each into an upper and lower half bearing cardinal numbers and the upper half of each of said charts having a prominent line adjacent the lower edge thereof to indicate the fraction line.

Signed at New York, in the county of New York and State of New York, this 3rd day of June, A. D. 1918.

MINNIE BLAU.

Witness:
MORRIS BLAU.